April 13, 1937.  O. F. CARLSON  2,076,547
LOW WATER AND PRESSURE CUT-OFF SWITCH
Filed April 6, 1936  2 Sheets-Sheet 1

Inventor:
Oscar F. Carlson

April 13, 1937.  O. F. CARLSON  2,076,547
LOW WATER AND PRESSURE CUT-OFF SWITCH
Filed April 6, 1936   2 Sheets-Sheet 2
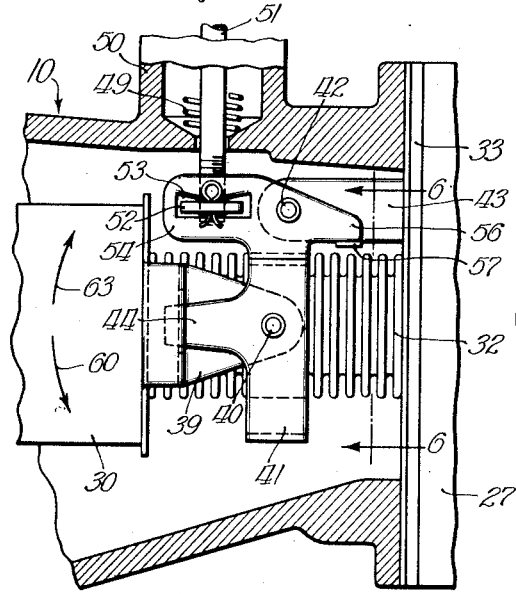
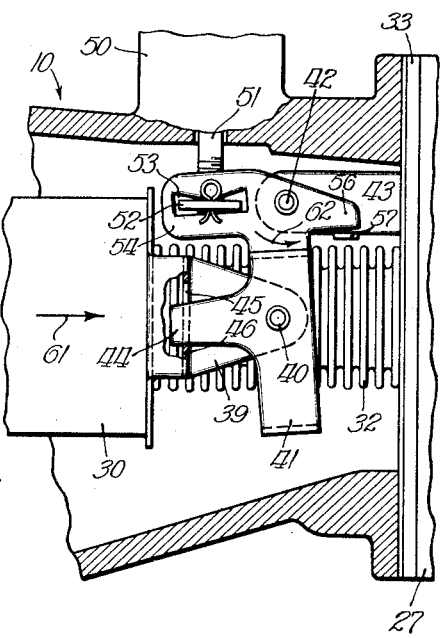
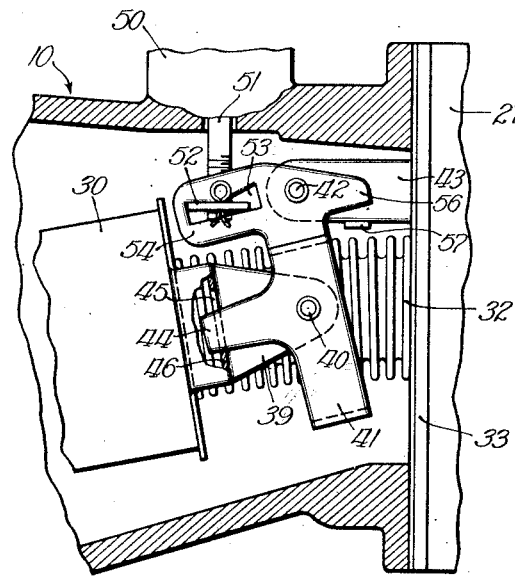
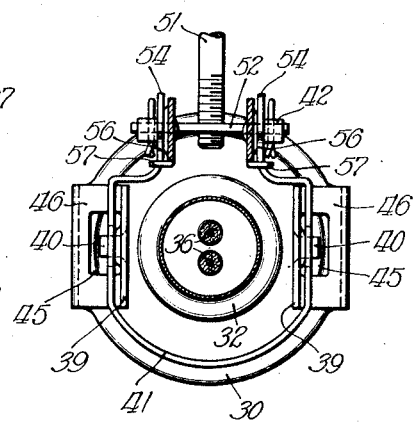
Inventor:
Oscar F. Carlson Patented Apr. 13, 1937

2,076,547

UNITED STATES PATENT OFFICE 2,076,547

LOW WATER AND PRESSURE CUT-OFF SWITCH

Oscar F. Carlson, Chicago, Ill., assignor of one-half to Oscar F. Carlson Company, Chicago, Ill., a corporation of Illinois, and one-half to Everett N. McDonnell, Chicago, Ill.

Application April 6, 1936, Serial No. 72,898

14 Claims. (Cl. 200—84)

My invention relates generally to regulating devices and it has particular relation to such devices disposed to be responsive to change in level and pressure of a liquid in a container such as a steam boiler.

The invention set forth herein relates to and constitutes an improvement on the liquid level and pressure device disclosed and claimed in my copending application, Serial No. 43,564, filed October 4, 1935, and assigned to the assignees of this application.

In my copending application I have provided a float chamber which is arranged to be connected to a steam boiler at a position corresponding to the desired water level in the boiler. Inside of the float chamber a float is flexibly mounted and is arranged to carry a switch of the mercury type. The float is connected to the float chamber by means of a flexible bellows which permits not only rotary motion of the float about an indefinite axis in the bellows but also permits translatory movement thereof with respect to the float chamber. Suitable conductors extend from the mercury switch in the float through the flexible bellows to terminals which may be interconnected in a control circuit for controlling the operation of a blower motor or the operation of a water inlet control valve or any other suitable device which it is desired to control in accordance with the water level and pressure in the boiler. In the event that the water in the boiler falls below a predetermined level, the float in the float chamber rotates to such a position that the mercury switch carried thereby is operated.

In order to render the device responsive to change in pressure, a stop is provided at one end of the float about which it is caused to rotate on the application of a predetermined pressure in the float chamber. When the pressure exceeds a predetermined value, the float will be rotated about the stop as an axis and the switch will be operated in a manner similar to its operation when the water drops to a predetermined level.

In the foregoing construction the rotation of the float in response to change in water level is about an indefinite axis. That is, depending upon the resiliency of the flexible bellows, the center of rotation may considerably vary. In addition, the adjustment in response to different pressures is somewhat inflexible. As a result it is difficult to provide a factory calibration for the device for different conditions of operation when the device is manufactured on a mass production basis. It is desirable, therefore, to make the operation of the float in response to change in water level and pressure more certain and more readily adjustable in order to obtain a closer regulation and more satisfactory operation of the switch carried by the float.

It is, therefore, an object of my invention to provide a liquid level and pressure regulating device which shall be simple, efficient and accurate in operation and which may be readily and economically manufactured and installed.

The principal object of my invention is to provide for pivoting the float of a liquid level and pressure regulating device in a float chamber about different fixed axes in response to change in the level and pressure of a liquid in the float chamber.

Another object of my invention is to provide for shifting the axis of rotation of a float in a float chamber from one pivot to another depending on level and pressure conditions of a liquid in the chamber to operate a switch carried by the float on occurrence of a predetermined level or pressure.

Another object of my invention is to provide for adjusting a switch carried by a float mounted for rotation about a plurality of axes for operation at different pressures.

A still further object of my invention is to provide for limiting the rotation of a support member for a float rotatably mounted thereon in a float chamber on creation of a vacuum in the float chamber or on movement of the support member to a predetermined position in response to the biasing force of a spring.

A more detailed object of my invention is to provide a liquid level and pressure responsive device having an electric control switch of the mercury type carried by a float which is pivotally mounted on a support member that itself is pivotally mounted in a float chamber and adjustably biased therefrom and which is operable about one center for low water and about another center in response to pressure.

Other objects of my invention will, in part, be obvious and, in part, appear hereinafter.

My invention, accordingly, is disclosed in the embodiment hereof shown in the accompanying drawings and comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawings in which.

Figures 3, 4, and 5 illustrate different operating positions of the float and support linkage therefor in the float chamber of my liquid level and pressure responsive device; and Figure 6 is a view taken along the line 6—6 of Figure 3, showing the linkage for mounting the float.

Figure 1:
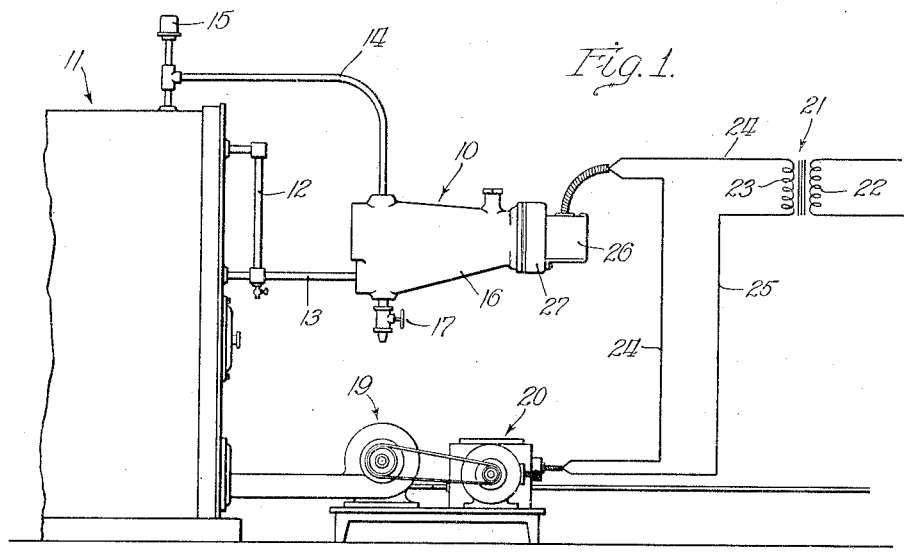
Figure 1 illustrates, diagrammatically, the arrangement of my liquid level and pressure device for operation in connection with a steam boiler.

Referring now particularly to Figure 1 of the drawings, it will be observed that the reference character 10 designates generally a liquid level and pressure responsive device which is arranged to be responsive to the level and pressure of the water in a boiler, shown generally at 11. The boiler 11 may be provided with the usual water gauge 12 at the bottom of which the device 10 may be connected by means of a pipe 13. The top of the device 10 is connected by means of a pipe 14 to the top of the boiler 11 and it may be connected to the pipe on which the safety valve 15 is mounted. The device 10 is provided with a float chamber 16 having a drain valve 17 to permit the interior thereof to be flushed out when desired.

The boiler 11 may be of the oil fired type having a blower, shown generally at 19, which may be driven by means of an electric motor, shown generally at 20. The motor 20 may be energized by means of a transformer, shown generally at 21, having a primary winding 22 for connection to a suitable source of alternating current and a secondary winding 23 which is connected by means of conductors 24 and 25 to the motor 20. It is desirable to deenergize the motor 20 when the water in the boiler 11 falls below a predetermined level or in the event that the pressure exceeds a predetermined value. In order to provide for this control a switch of the mercury type is interposed in the conductor 24. The construction and arrangement of the switch will be set forth in detail hereinafter. The terminals of the switch are connected to a terminal box 26 that is mounted on a switch box 27 at the right hand end of the float chamber 16.

Figure 2:
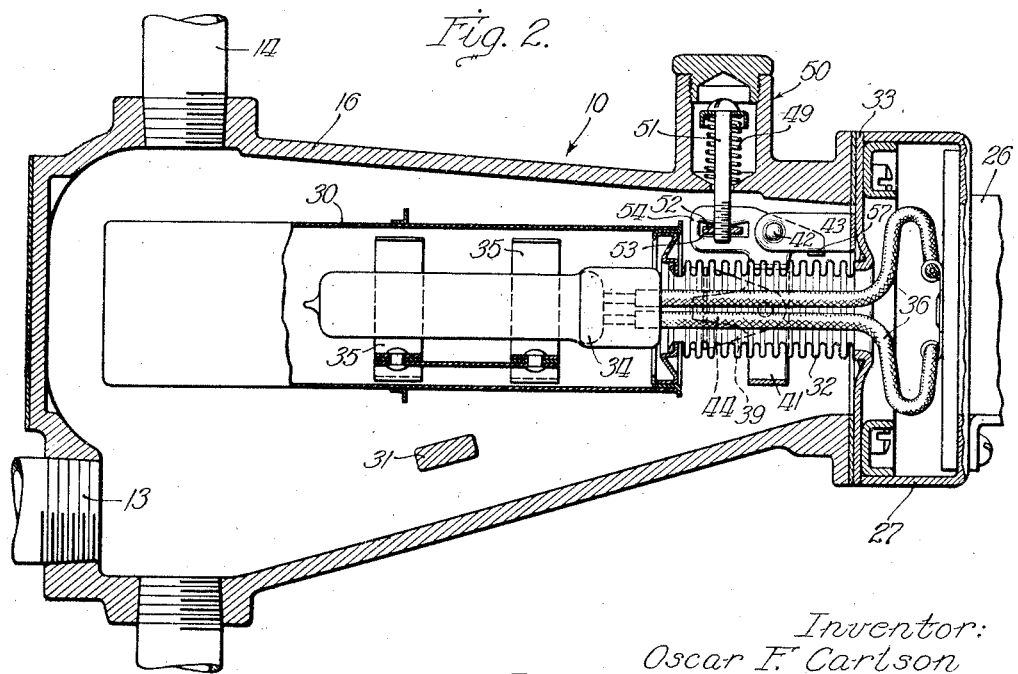
Figure 2 is a view, partly in side elevation and partly in section, showing the features of construction of the liquid level and pressure responsive device.

The interior details of construction of the device 10 are illustrated in Figure 2 of the drawings. As there shown a float 30 is flexibly mounted in the float chamber 16 and is limited in its downward movement by means of a stop 31 which may be cast integrally with the walls of the float chamber 16. The float 30 is flexibly mounted within the float chamber 16 by means of a bellows 32 which is connected between the right hand end of the float 30 and a disc 33 that is provided with a centrally located aperture and which is interposed between the switch box 27 and the right hand end of the float chamber 16. A switch 34, preferably of the mercury type, is mounted by means of clips 35 within the float 30, and terminals of which are connected by means of conductors 36 extending through the flexible bellows 32 into the switch chamber 27 where they may be connected by suitable terminals (not shown) in the terminal box 26 to the respective sections of the conductor 24. It will be understood that the sections of the conductor 24 are interconnected by means of the switch 34 so that when the float 30 is, for example, in the position shown in Figure 2 of the drawings, the circuit will be completed from the transformer 21 and the motor 20 will be energized.

It is desirable, as has been set forth hereinbefore, to provide for the rotation of the float 30 about a fixed pivot in response to change in level of the liquid. For this purpose the float 30 is provided at the right hand end with a pair of ears 39 which are pivotally mounted on short shafts 40, shown in Figures 3, 4, 5 and 6, that are carried by means of a yoke 41. The yoke 41 is itself pivoted on a shaft 42 which is carried by means of a bifurcated support member 43 that may be mounted on the disc 33. Because of this type of mounting it will be observed that the float 30 is pivotally mounted about a fixed axis rather than being mounted for rotation about a center which is somewhat indefinite due to variations in the construction of the flexible bellows 32.

It is also desirable to provide for the rotation of the float 30 in response to a predetermined pressure in such a manner that the switch 34 carried thereby will be operated in a manner similar to its operation in the event that the water in the boiler 11 falls below a predetermined level. For this purpose the yoke 41 is provided with a pair of rearwardly extending arms 44, Figures 3, 4 and 5, which are arranged to move within slots 45, Figures 4 and 5, located in offset portions 46 of the ears 39, as is more clearly illustrated in Figure 6 of the drawings. With a view to providing for regulating the pressure at which the float 30 is moved to operate the switch 34, a spring 49 mounted in a spring housing 50, formed integrally with the float chamber 16, is provided. The spring 49 is of the compression type and is arranged to operate through a screw 51 to bias the yoke 41 in a clockwise direction. At its lower end the screw 51 is threaded in a crosshead 52 which is mounted transversely in suitable openings 53 in rearwardly extending arms 54 of the yoke 41. By adjusting the screw 51 in the crosshead 52 it is possible to cause the switch 34 to be operated at different pressures depending upon the extent to which the spring 49 is compressed.

The rotation of the yoke 41 in a clockwise direction from the position shown in Figure 3 of the drawings should be prevented in the event that the float chamber 16 is subjected to a vacuum instead of pressure and also to limit the movement thereof due to the biasing force of the spring 49. For this purpose the yoke 41 is provided with a pair of forwardly extending arms 56 which are arranged to engage a pair of outwardly extending lugs 57 that may be formed integrally with the arms of the bifurcated support member 43, as is more clearly shown in Figure 6 of the drawings.

In describing the operation of my novel liquid level and pressure responsive device, it will be assumed that the boiler 10 is operating under conditions of normal water level and pressure. Under these assumed operating conditions the blower 19 will be driven by the motor 20 which will be energized since the float 30 will be in the position shown in Figure 2 of the drawings, and the switch 34 will be in a circuit closing position.

In the event that the water in the boiler 11 falls below a predetermined level which corresponds to the position of the float 30, as shown in Figures 2 and 3 of the drawings, it will rotate in a counter-clockwise direction, as indicated by the arrow 60, about the short shafts 40 as an axis and, if the level falls sufficiently low, the switch 34 will be turned to such a position that the mercury contained therein will no longer bridge the switch terminals and, as a result, the energizing circuit for the motor 20 will be interrupted. A suitable alarm may then be given to indicate that the water has fallen below the desired level or some automatic means may be initiated in operation to restore the level of the water. As soon as the level is restored, the switch 34 will again be moved to the circuit closing position and the operation of the blower 19 by the motor 20 will again be effected.

If the pressure in the boiler 11 and correspondingly the pressure in the float chamber 16 exceeds a predetermined value, the float 30 will be moved to the right as indicated by the arrow 61 in Figure 4 of the drawings, thereby compressing the bellows 32 slightly. In response to this movement of the float 30 the yoke 41 rotates in a counter-clockwise direction, as indicated by the arrow 62, until the rearwardly extending arms 44 engage the bottoms of the slots 45 in the ears 39. Due to this engagement no further relative movement of the float 30 with respect to the yoke 41 takes place. On further increase in pressure the float 30 will be caused to rotate about the shaft 42 as an axis to the position shown in Figure 5 of the drawings. This position corresponds substantially to the position to which the float 30 will be rotated in response to a predetermined lowering of the level of the water in the float chamber 16. The switch 30 will likewise be operated in response to the occurrence of the predetermined pressure to open the energizing circuit to the motor 20, which will no longer drive the blower 19. As soon as the pressure is relieved in the boiler 11 the float 30 will be restored to its normal position and the switch 34 will again be moved to the circuit closing position. The motor 20 will again be energized to drive the blower 19.

Should a vacuum be created in the float chamber 16 for any reason there will be a tendency for the float 30 to be moved to the left in response to atmospheric pressure which is applied to the bellows 32. This would cause the yoke 41 to rotate in a clockwise direction beyond the position shown in Figure 3 of the drawings. Such rotation is prevented by the engagement of the forwardly extending arms 56 with the outwardly extending lugs 57. A similar effect would also be caused in the event that the level of the water in the boiler exceeded the normal level. The float 30 would then rotate in a clockwise direction as indicated by the arrow 63 in Figure 3 of the drawings. On engagement of the rearwardly extending arms 44 with the bottoms of the slots 45 there would be a tendency for the yoke 41 to be rotated in a clockwise direction. However, such rotation is prevented on engagement of the forwardly extending arms 56 with the lugs 57.

While my invention has been disclosed in connection with the control of a steam boiler, it will be obvious to those skilled in the art that it may be applied in other applications where it is desirable to regulate for predetermined pressure and liquid level conditions. Therefore, since certain further changes may be made in the foregoing construction and different embodiments of the invention may be made without departing from the scope thereof, it is intended that all matters contained in the above description or shown in the accompanying drawings shall be interpreted as illustrative and not in a limiting sense.

I claim:

1. A liquid level and pressure responsive device comprising, in combination, a float chamber disposed to be connected to a container of a liquid under pressure, a float in said chamber, means for mounting said float to rotate about a definite axis in response to change in level of said liquid, means for mounting said float to rotate about another definite axis in response to change in pressure, and control means disposed to be operated in response to change in position of said float caused by change in level or pressure.

2. A liquid level and pressure responsive device comprising, in combination, a float chamber disposed to be connected to a container of a liquid under pressure, a float in said chamber, means for mounting said float to rotate about a definite axis in response to change in level of said liquid, means for mounting said float to rotate about another definite axis in response to change in pressure, and electric switch means carried by said float and disposed to be operated in response to change in position thereof.

3. A liquid level and pressure responsive device comprising, in combination, a float chamber disposed to be connected to a container of a liquid under pressure, a float in said chamber, liquid level axle means and pressure axle means in said chamber about which said float is disposed to rotate, means for shifting the axis of rotation of said float from one axle means to the other axle means, and control means disposed to be operated in response to change in position of said float caused by change in level or pressure.

4. A liquid level and pressure responsive device comprising, in combination, a float chamber disposed to be connected to a container of a liquid under pressure, a float in said chamber, liquid level axle means and pressure axle means in said chamber about which said float is disposed to rotate, means for shifting the axis of rotation of said float from one axle means to the other axle means, and electric switch means carried by said float and disposed to be operated in response to change in position thereof.

5. A liquid level and pressure responsive device comprising, in combination, a float chamber disposed to be connected to a container of a liquid under pressure, a support member pivotally carried by said chamber, a float pivotally carried by said support member, and control means disposed to be operated in response to change in position of said float with respect to either of the pivot points.

6. A liquid level and pressure responsive device, comprising, in combination, a float chamber disposed to be connected to a container of a liquid under pressure, a support member pivotally carried by said chamber, a float pivotally carried by said support member, means for limiting the relative movement of said float with respect to said support member, and control means disposed to be operated in response to change in position of said float with respect to either of the pivot points.

7. A liquid level and pressure responsive device comprising, in combination, a float chamber disposed to be connected to a container of a liquid under pressure, a support member pivotally carried by said chamber, a float pivotally carried by said support member, said float being disposed to rotate relative to said support member on change in level of said liquid and about the pivot point of said support member on change in pressure, and electric switch means carried by said float and disposed to be operated in response to change in position thereof.

8. A liquid level and pressure responsive device comprising, in combination, a float chamber disposed to be connected to a container of a liquid under pressure, a support member pivotally carried by said chamber, a float pivotally carried by said support member, said float being disposed to rotate relative to said support member on change in level of said liquid and about the pivot point of said support member on change in pressure, resilient means for biasing said support member in a direction opposite to the direction of movement thereof in response to the application of pressure to said float, and electric switch means carried by said float and disposed to be operated in response to change in position thereof.

9. A liquid level and pressure responsive device comprising, in combination, a float chamber disposed to be connected to a container of a liquid under pressure, a support member pivotally carried by said chamber, a float pivotally carried by said support member, said float being disposed to rotate relative to said support member on change in level of said liquid and about the pivot point of said support member on change in pressure, resilient means interposed between said chamber and said support member for opposing the movement of said support member in response to pressure, means for adjusting said resilient means for different pressures, and electric switch means carried by said float and disposed to be operated in response to change in position thereof.

10. A liquid level and pressure responsive device comprising, in combination, a float chamber disposed to be connected to a container of a liquid under pressure, a support member pivotally carried by said chamber, a float pivotally carried by said support member, a metallic bellows interconnecting said chamber and said float, means for limiting the relative movement of said float with respect to said support member thereby permitting said float to rotate relative to said support member on change in level of said liquid and with said support member on change in pressure, electric switch means carried by said float and disposed to be operated in response to change in position thereof, and conductors for connection to said switch means extending through said bellows.

11. A liquid level and pressure responsive device comprising, in combination, a float chamber disposed to be connected to a container of a liquid under pressure, a support member pivotally carried by said chamber, a float pivotally carried by said support member, a metallic bellows interconnecting said chamber and said float, means for limiting the relative movement of said float with respect to said support member thereby permitting said float to rotate relative to said support member on change in level of said liquid and with said support member on change in pressure, resilient means interposed between said chamber and said support member for opposing the movement thereof in response to pressure, electric switch means carried by said float and disposed to be operated in response to change in position thereof, and conductors for connection to said switch means extending through said bellows.

12. A liquid level and pressure responsive device comprising, in combination, a float chamber disposed to be connected to a container of a liquid under pressure, a float in said chamber, liquid level trunnion means and pressure trunnion means in said chamber about which said float is disposed to rotate, means for shifting the rotation of said float from one trunnion means to the other trunnion means, means for limiting the rotation of said float about said pressure trunnion means on creation of a vacuum in said float chamber, and control means disposed to be operated in response to change in position of said float caused by change in level or pressure.

13. A liquid level and pressure responsive device comprising, in combination, a float chamber disposed to be connected to a container of a liquid under pressure, a first set of trunnions carried by said chamber, a support member mounted on said trunnions and provided with a second set of trunnions, a float mounted on said second set of trunnions, means for shifting the axis of rotation of said float from one set of trunnions to the other in response to change in pressure, means for limiting the rotation of said support member about said first set of trunnions on creation of a vacuum in said float chamber, and control means disposed to be operated in response to change in position of said float caused by change in level or pressure.

14. A liquid level and pressure responsive device comprising, in combination, a float chamber disposed to be connected to a container of a liquid under pressure, a support member pivotally carried by said chamber, a float pivotally carried by said support member, stop means disposed to limit the movement of said support member on creation of a vacuum in said float chamber, and electric switch means carried by said float and disposed to be operated in response to change in position thereof.

OSCAR F. CARLSON.